Oct. 31, 1933.  J. M. CROWE  1,932,770
SHOCK ABSORBER
Filed March 5, 1932
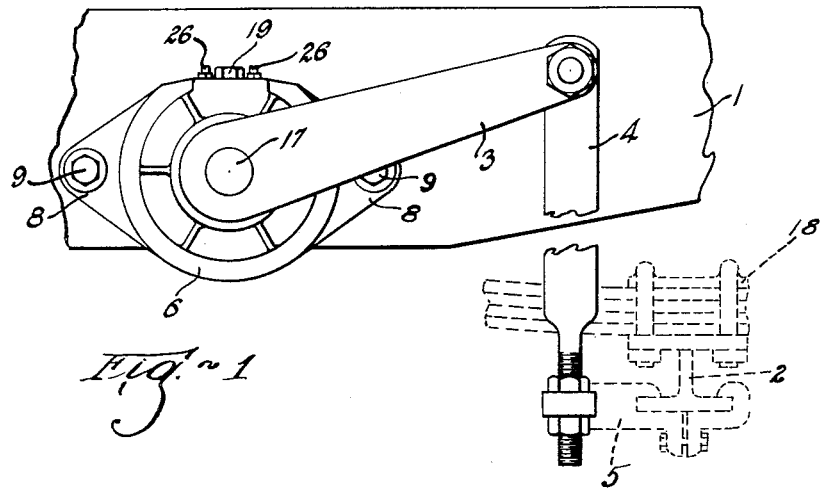
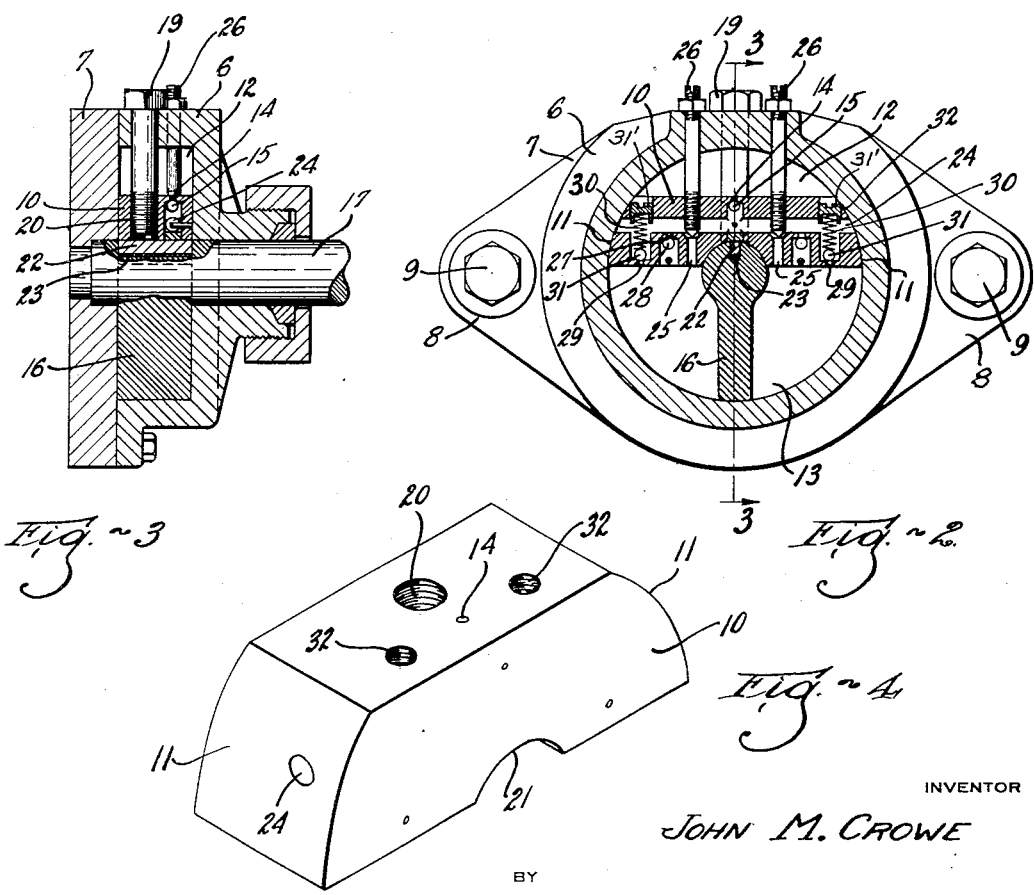
INVENTOR
JOHN M. CROWE
BY
Brockett, Hyde, Higley & Meyer
ATTORNEYS Patented Oct. 31, 1933

1,932,770

UNITED STATES PATENT OFFICE 1,932,770

SHOCK ABSORBER

John M. Crowe, Covington, Ky.

Application March 5, 1932. Serial No. 596,913

12 Claims. (Cl. 188—89)

My invention relates to a shock absorber and, particularly, to a shock absorber of the hydraulic type as applied to vehicles as, for instance, automobiles.

One object of my invention is to provide a shock absorber of the rotary type including a fluid filled piston or movable abutment chamber, a fluid supply for maintaining the piston or movable abutment chamber constantly in filled condition, and a piston or movable abutment operable in the chamber by movement of moving parts of the vehicle to which the shock absorber is applied, the construction being such that movement of the piston or movable abutment in either direction is retarded by retarding the flow of fluid out of the chamber. The shock absorber is generally connected to the parts moved by the action of the springs supporting the vehicle in such manner that the shock absorber will be effective to prevent sudden action of the vehicle springs in either direction to thereby reduce the shocks arising from rough and uneven roads.

Another object of my invention is to provide a shock absorber embodying means for compensating for overload conditions on the shock absorber such as occur when the springs act instantaneously at substantially their maximum.

Still another object of my invention is to provide a shock absorber embodying a one-piece member including, a single passage from one side of the piston to the other and providing a simple and efficient means for maintaining a tight fluid seal between the supply chamber and the piston chamber, the one-piece member carrying the ports, valves, single passage from one side of the piston chamber to the other, and being so constructed that the valve ports and single passage may be drilled and the member machined with the minimum of trouble and expense.

Various other objects and advantageous features of my invention will be seen in the following description and one embodiment thereof may be seen in the accompanying drawing wherein similar characters of reference designate corresponding parts, and wherein:

Fig. 1 is an elevation showing a shock absorber constructed in accordance with my invention and attached to a portion of the body frame of a vehicle and the axle thereof, a portion of the body frame, a spring and an axle being shown in fragmentary elevation; Fig. 2 is an end view, partly in section and partly in elevation, of a shock absorber constructed in accordance with my invention; Fig. 3 is a sectional view taken on the line 3—3 of Fig. 2; and Fig. 4 is a perspective view of the partition member carrying the various flow controlling valves and passages that form a part of the shocker absorber.

Referring to the drawing and particularly Fig. 1 thereof, I have shown a shock absorber constructed in accordance with my invention attached to a frame member 1 and an axle member 2 of a vehicle by means of arms 3 and 4 and a clamp 5, and consisting of a casing having a ribbed face portion for strength and embodying a casing member 6 and a casing closure member 7 that is adapted to be secured to the frame member 1 of the vehicle by means of ears 8 and bolts 9.

The casing member 6 is preferably cylindrical and is adapted to receive a one-piece diametral horizontal crosswise partition 10 whose upper and lower surfaces are preferably flat and whose ends 11 are of the contour to conform to the inner surface of the cylindrical casing member 6. This partition member, when disposed within the cylindrical casing member 6 divides the casing member into an upper chamber 12 and a lower chamber 13, the upper chamber serving as a fluid reservoir to maintain the lower chamber filled with a suitable fluid by way of a port 14 under the control of a ball valve 15, and a lower chamber providing an operating space for a blade type piston 16 mounted on or forming a part of a shaft 17 that extends through the shock absorber casing, is journalled in the casing cover plate 7, and is operable by the arms 3 and 4 which move in response to the relative movement between the frame member 1 and axle 2 under the influence of the spring 18.

The contour of the ends of the partition member 10 being the same as the contour of the inner surface of the cylindrical casing member 6, permits a fluid tight seal to be made between the chambers 12 and 13 by moving the partition member upwardly into wedging relation with the walls of the cylindrical casing member as shown in Fig. 2. As best shown in Fig. 1, a screw bolt 19 extending downwardly through the cylindrical casing member 6 and the chamber 12 has a threaded end adapted to threadedly engage the partition member 10 by way of an internally threaded opening 20 whereby rotation of the screw bolt 19 in one direction will draw the partition member 10 upwardly into wedging engagement with the internal walls of the cylindrical casing member 6. The partition member 10 is provided with a semi-circular cut-out portion 21 adapted to fit over the upper side of the shaft 17 carrying the blade piston 16, and, to prevent leakage from one side of the piston 16 to the other over the top of the shaft when the partition member is moved upwardly into fluid tight wedging relation with the internal walls of the cylindrical casing member 6, a bar or the like 22 that fits in a groove on the top of the shaft 17 is constantly forced upwardly into engagement with the surface of the semi-circular cut-out portion 21 of the partition by means of a leaf spring 23 disposed beneath said bar or the like.

In accordance with my invention, the partition member 10 is preferably a one-piece member embodying a plurality of ports leading from the chamber 13 on each side of the blade piston 16 through a single central bore 24 in the partition member for permitting flow of fluid from one side of the blade piston 16 to the other in response to swinging movement of the blade piston due to movement of the arms 3 and 4 by relative movement between the frame member 1 and axle 2 of the vehicle. Referring to Fig. 3, it will be noted that the blade piston 16 is of a width to fit snugly in the casing formed by the members 6 and 7 to prevent flow of fluid from one side of the piston to the other around its sides and that the partition member 10 likewise has a snug fit to prevent flow of fluid from the chamber 12 to the chamber 13 by any other way than the port 14.

The partition member 10 on each side of the blade piston 16 is provided with a fluid exhaust port 25 under the control of a needle valve 26 adjustable from the outside of the shock absorber casing through which fluid may flow out of one side or the other of the chamber 13 in response to movement of the piston 16. Likewise, the partition member 10 is provided on each side of the blade piston 16 with an inlet port 27 under the control of a ball valve 28 and through which fluid forced into the bore 24 through one of the ports 25 by movement of the piston in one direction or the other may flow into the side of the chamber 13 which is being enlarged by movement of the piston, the ball valve 28 being effective to close this port against the flow of fluid therethrough to the bore 24. Thus, all flow of fluid from one side of the blade piston 16 to the other in response to its movement must pass through one or the other of the ports 25 under the control of the needle valves 26 whereby the rate of flow may be controlled and the speed of movement of the piston may be regulated by adjusting the resistance thereto through control of the rate of flow of the fluid.

Further, in accordance with my invention, means have been provided for permitting the rate of flow of fluid from one side of the piston 16 to the other to be increased proportionally to relieve severe shocks and strains on the shock absorber mechanism when the blade piston 16 attempts to move its greatest distance in a minimum length of time due to maximum separation or approach of the frame member 1 to the axle member 2 which occurs when a vehicle strikes a deep rut or passes over a relatively large obstacle. This means consists of relief ports 29, one on each side of the partition member 10 and on opposite sides of the blade piston 16, the ports normally being held closed by springs or other resilient means 30 whose resistance to upward movement of the ball valves 31 and opening of the ports 29 may be regulated by adjusting the compression on the springs or resilient members 30 through adjusting screws 31' disposed in internally threaded openings 32 in the partition member 10 and in alignment with the ports 29. The pressure resisting power of these springs or other resilient members 30 are preferably adjusted to such an extent that the ports 29 will not be opened by any pressure thereon less than, for example, twenty-five thousand pounds (25,000 lbs.), but when this maximum pressure is reached, the ports 29 will be open through upward movement of the ball valve 31 pressure applied thereon which will permit fluid to flow from one side of the blade piston 16 to the other at a faster rate than would otherwise be possible. This construction protects the shock absorber mechanism against injury due to sudden excessive shocks or jars and, at the same time, renders the shock absorber more effective as a means for absorbing extreme shocks and preventing such shocks from being transmitted to an occupant of the vehicle or to the upper part of the vehicle itself.

Referring to the drawing and the preceding description, it will be seen that I have provided a shock absorber embodying numerous advantageous features. For example, I have provided a shock absorber having a one-piece partition member so arranged that the passages and ports therein may be bored out and the partition member machined with a minimum amount of trouble and expense. This is provided for by having a single central passage leading from one side of the blade piston to the other and arranging the flow ports and openings in such manner that they can be bored out from either one side or the other of the partition member. Another advantageous feature resides in the fact that I have provided a shock absorber having adjustments accessible from the outside for regulating the rate of flow of fluid from one side of the blade piston to the other and thereby controlling the possible speed of movement of the piston in either direction and have provided means for relieving otherwise excessive strain on both the shock absorber mechanism and the upper part of the vehicle itself when the vehicle strikes a deep rut or passes over a relatively large obstacle. Various other advantageous features will be readily apparent.

What I claim is:

1. A shock absorber connected to the running gear of a vehicle comprising a casing, a partition member for dividing said casing into an upper and a lower chamber, means for providing a fluid tight seal between said chambers by moving said partition member into engagement with said casing walls, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, and a plurality of valves in said passage adjustably controlling the action of said blade piston and regulating the flow of fluid through said passage.

2. A shock absorber connected to the running gear of a vehicle comprising a casing, a partition member for dividing said casing into an upper and a lower chamber, means for providing a fluid tight seal between said chambers by moving said partition member into wedging engagement with said casing walls, means for moving said partition member into such wedging engagement, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, and a plurality of valves in said passage adjustably controlling the action of said blade piston and regulating the flow of fluid through said passage.

3. A shock absorber connected to the running gear of a vehicle comprising a casing, a partition member for dividing said casing into an upper and a lower chamber, means for providing a fluid tight seal between said chambers by moving said partition member into engagement with said casing walls, means operable from the outside of said casing for moving said partition member into such engagement, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, and a plurality of valves in said passage adjustably controlling the action of said blade piston and regulating the flow of fluid through said passage.

4. A shock absorber connected to the running gear of a vehicle comprising a casing, a partition member for dividing said casing into an upper and a lower chamber, means for providing a fluid tight seal between said chambers by moving said partition member into engagement with said casing walls, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, and automatically operating pressure relief means on each side of said blade piston.

5. A shock absorber connected to the running gear of a vehicle comprising a casing, a partition member for dividing said casing into an upper and a lower chamber, means for providing a fluid tight seal between said chambers by moving said partition member into engagement with said casing walls, means for moving said partition member into such engagement, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, and automatically operating pressure relief means on each side of said blade piston.

6. A shock absorber connected to the running gear of a vehicle comprising a casing, a partition member for dividing said casing into an upper and a lower chamber, means for providing a fluid tight seal between said chambers by moving said partition member into fluid tight engagement with said casing walls, means operable from the outside of said casing for moving said partition member into such fluid tight engagement, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, and automatically operating pressure relief means on each side of said blade piston.

7. A shock absorber connected to the running gear of a vehicle comprising a casing, a partition member for dividing said casing into an upper and a lower chamber, means for providing a fluid tight seal between said chambers by moving said partition member into engagement with said casing walls, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, automatically operating pressure relief means on each side of said blade piston, and means for varying the pressure at which said pressure relief means becomes effective.

8. A shock absorber connected to the running gear of a vehicle comprising a casing, a partition member for dividing said casing into an upper and a lower chamber, means for providing a fluid tight seal between said chambers by moving said partition member into engagement with said casing walls, means operable from the outside of said casing for moving said partition member into such engagement, a blade piston rotatably mounted in said lower chamber to be actuated by said running gear, said upper chamber forming a liquid reservoir for maintaining said lower chamber filled with a suitable liquid, a valve controlled passage between said upper and lower chamber and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, automatically operating pressure relief means on each side of said blade piston, and means for varying the pressure at which said pressure relief means becomes effective.

9. A shock absorber connected to the running gear of a vehicle, comprising a casing, a partition member for dividing said casing into an upper and a lower chamber and movable to provide a fluid tight seal with said casing walls, a blade piston rotatably mounted in said lower chamber and actuated by movement of said running gear, said upper chamber forming a liquid reservoir for maintaining said lower chamber filled with a suitable liquid, a valve controlled passage between said upper and lower chambers and connecting with a single passage in said partition member, said single passage leading from one side of said lower chamber to the other and connecting with said lower chamber on opposite sides of said blade piston, and a plurality of valves in said passage adjustably controlling the action of said blade piston and regulating the flow of fluid through said passage.

10. A shock absorber connected to the running gear of a vehicle, comprising a casing, a partition member for dividing said casing into an upper and a lower chamber and movable to provide a fluid tight seal with said casing walls, a blade piston rotatably mounted in said lower chamber and actuated by movement of said running gear, said upper chamber forming a liquid reservoir for maintaining said lower chamber filled with a suitable liquid, a valve controlled passage between said upper and lower chambers and connecting with a single passage in said partition member, said single passage leading from one side of said lower chamber to the other and connecting with said lower chamber on opposite sides of said blade piston, a plurality of valves in said passage adjustably controlling the action of said blade piston and regulating the flow of fluid through said passage, and automatically operating pressure relief means in said passage apart from said valve means.

11. A shock absorber connected to the running gear of a vehicle, comprising a casing, a partition member for dividing said casing into an upper and a lower chamber and adjustably movable into fluid tight engagement with the casing walls, said upper chamber forming a fluid reservoir and having connection with said lower chamber for maintaining said lower chamber filled with fluid, a movable abutment operating in said lower chamber by movement of the vehicle running gear, a passage in said partition member connecting said lower chamber on opposite sides of said movable abutment, and valve means in said passage controlling the flow of fluid therethrough to thereby control the speed of movement of said movable abutment.

12. A shock absorber connected to the running gear of a vehicle, comprising a casing, a partition member for dividing said casing into an upper and a lower chamber and adjustably movable into fluid tight engagement with the casing walls, said upper chamber forming a fluid reservoir and having connection with said lower chamber for maintaining said lower chamber filled with fluid, a movable abutment operating in said lower chamber by movement of the vehicle running gear, a passage in said partition member connecting said lower chamber on opposite sides of said movable abutment, valve means in said passage controlling the flow of fluid therethrough to thereby control the speed of movement of said movable abutment, and automatically operating pressure relief means in said passage apart from said valve means.

JOHN M. CROWE.